Jan. 24, 1956  W. P. OEHLER  2,731,900
PRESS WHEEL FOR PLANTERS
Filed April 10, 1952
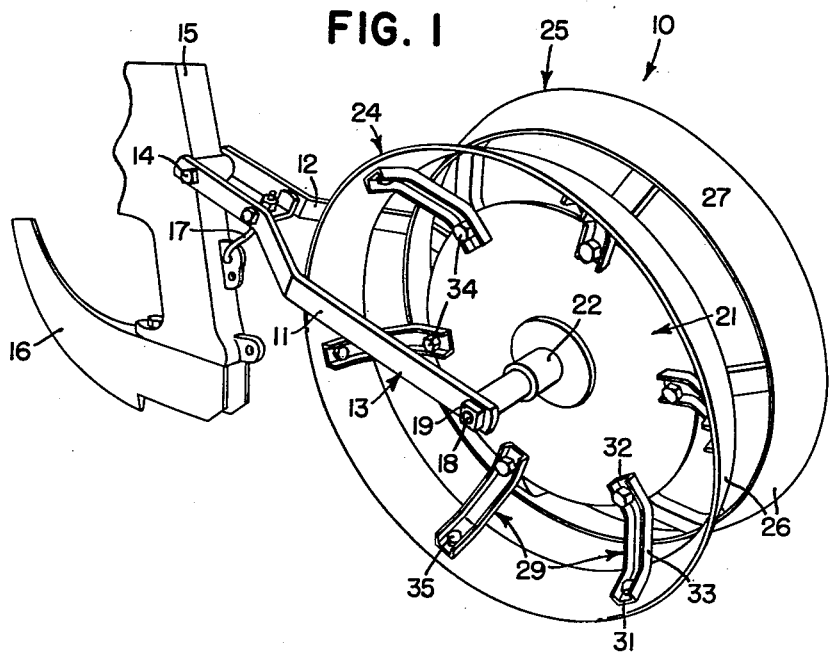
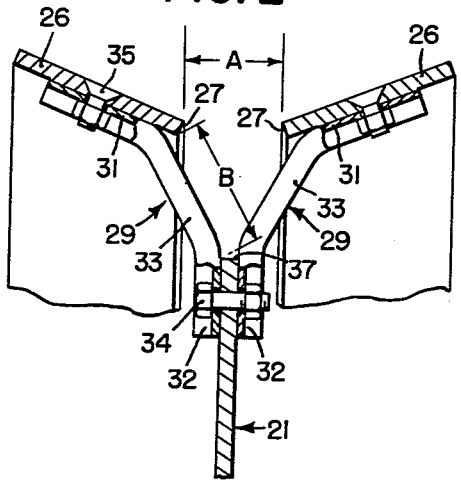
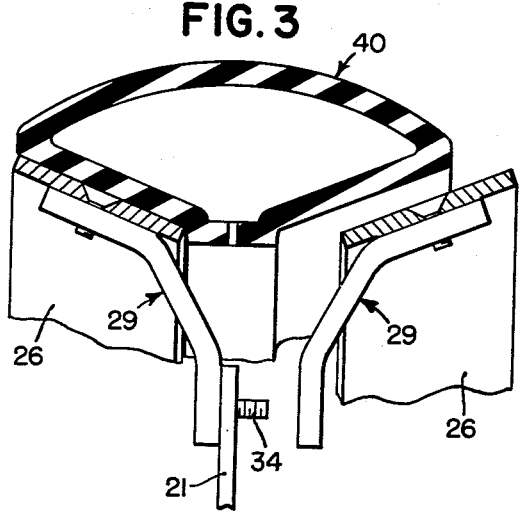
INVENTOR.
WILLIAM P. OEHLER
BY
ATTORNEYS

United States Patent Office 2,731,900
Patented Jan. 24, 1956

2,731,900
PRESS WHEEL FOR PLANTERS

William P. Oehler, Moline, Ill., assignor to Deere & Company, Moline, Ill., a corporation of Illinois Application April 10, 1952, Serial No. 281,547

2 Claims. (Cl. 97—56)

The present invention relates generally to agricultural implements and more particularly to planters and the like.

The object and general nature of the present invention is the provision of a new and improved press wheel, wherein the body of the wheel is formed as a continuous disk-like member, with axially separated rim sections fixed by suitable means to the peripheral portions of the disk. According to the present invention, where the major portion of the press wheel is formed as a solid continuous member, there is little likelihood of stalks, trash and the like becoming entangled in the wheel, whereas this is a fairly common occurrence with press wheels of the spoke type, particularly under certain operating conditions where excessive trash, stalks and the like are encountered.

It is, in addition, a further feature of this invention to provide a new and improved press wheel construction in which the rim sections of the press wheel are spaced apart axially, whereby there is no tendency for soil and the like to build up in the central portion of the wheel, the means connecting the axially separated rim sections with the solid disk member being so constructed and arranged that any stones, clods and the like that are small enough to pass between the rim sections cannot become jammed or lodged between either or both of the rim sections and the adjacent edge portions of the wheel disk.

Still further, another feature of this invention is the provision of a press wheel of the axially separated rim type, with means for detachably connecting the rims with the center disk member, whereby when desired the rim sections, either or both of them, may be removed to permit the ready mounting, where desired, of a rubber tread member or section, where that type of press wheel is desired. Thus, according to the present invention, a press wheel construction is provided which is generally quite satisfactory as a press wheel without any rubber or flexible tread sections, but where conditions require it, the press wheel of the present invention is so constructed and arranged as to readily accommodate a rubber tire, tread section or the like, it not being necessary, according to the present invention, to stretch the tire or tread section over the rim when mounting the tire or tread section in place.

These and other objects and advantages of the present invention will be apparent to those skilled in the art after a consideration of the following detailed description, taken in conjunction with the accompanying drawings, in which:

Figure 1 is a perspective view of the press wheel construction in which the principles of the present invention have been incorporated.

Figure 2 is a fragmentary sectional view taken along a generally radially extending plane passing through the axis of the wheel.

Figure 3 is a view similar to Figure 2, showing the manner in which a rubber tire or tread section may be mounted in place on the press wheel of the present invention, without requiring stretching of the tread over the press wheel rim.

Referring now to the drawings, the press wheel structure in which the principles of the present invention have been incorporated is indicated in its entirety by the reference numeral 10 and, for purposes of illustration, has been shown as mounted for rotation between two bars 11 and 12 which, suitably secured together, form a press wheel frame 13 which is adapted to be pivotally connected, as by a bolt 14, to the shank 15 of a planter in which the press wheel structure 10 is incorporated. The shank 15 carries a furrow opening shoe or runner 16, and the press wheel frame 13 may be adjusted relative to the shank 15 by an adjusting bolt 17. The rear ends of the frame bars 11 and 12 are connected by a shaft 18 on which the press wheel 10 is mounted for rotation, the ends of the shaft being shouldered and threaded to receive nuts 19 by which the rear ends of the press wheel frame bars 11 and 12 are securely fixed to the shaft 18.

The press wheel structure 10 includes a substantially solid continuous disk member 21 carrying a hub 22 by means of which the disk member 21 is mounted for rotation on the shaft 18. A pair of substantially identical rim sections 24 and 25 are disposed in axially spaced apart relation and are disposed about the disk member 21 substantially concentric therewith. Each of the rim sections 24 and 25 includes an earth-contacting rim proper, indicated at 26, lying in a conical surface and arranged with their radially innermost edges 27 disposed adjacent one another but spaced apart axially. For securing the rim sections 24 and 25 to the disk section 21, a plurality of strut members 29 are provided. Each strut member 29 includes an outer portion 31 shaped to fit flat against the undersurface of the associated rim section and a substantially radially inwardly extending section 32 that is adapted to fit flat against the adjacent portion of the disk section 21. The two portions of the strut member just mentioned are interconnected by an angled portion 33. Each strut member 29 serves as an attaching member for fixing the associated rim section to the disk 21. The radially inner ends 32 of the strut members 29 are apertured to receive detachable means 34, such as bolts or the like, or, if desired, the outer ends of the strut members 29 may be permanently fixed to the associated rim section 26 by means of bolts 35 or the like. By removing the bolts 34, or the nuts on the threaded ends thereof, the rim sections 24 and 25, or at least one of them, may readily be removed from the associated disk section 21.

It will be seen from Figure 2 that the distance, indicated at A, between adjacent edges 27 of the rims 26, are spaced apart a distance that is less than the distance, indicated at B, between the inner edge 27 of each rim section and the outer edge, shown at 37 in Figure 2, of the disk section 21. Thus, any clod or stone that might find its way between the rims 26 will not be jammed in between a rim and the edge of the disk 21; instead, if a stone or clod is small enough to pass between the rims, it will readily move through the space between the rim and the adjacent edge of the disk section 21.

The press wheel of the present invention readily adapts itself for use with rubber tires or tread sections, such as that shown at 40 in Figure 3. Conventionally, these rubber tread sections have to be applied to existing press wheels by stretching them over the rim of the wheel. However, the present invention, with its detachable means for fixing the rim sections to the disk, provides for readily mounting and dismounting the rubber tire or tread section 40, merely by taking off the nuts and/or the bolts 34, whereupon either or both of the rim sections may be separated from the wheel proper and the tire applied, after which the two rim sections are then reassembled and firmly fixed to the disk 21.

Since the disk 21 occupies the major portion of the center of the wheel, there is little likelihood of stalks and the like becoming entangled in the wheel, which sometimes occurs when press wheels of conventional construction, including a hub and radiating spokes to the outer ends of which rim sections are secured, are used.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A press wheel for planters and the like, comprising a relatively solid disk central section having a hub, a pair of axially spaced apart rim sections, said disk section having a diameter several times the diameter of said hub and said disk section extending radially the major portion of the distance from the center of the hub to said rim sections, whereby to minimize the tendency of stalks, trash and the like to become entangled in the wheels, and peripherally spaced apart struts connecting said rim sections to the peripheral portion of said disk section, the generally axial spacing between adjacent edges of said rim sections being slightly less than the shortest distance from the edge of said disk section to the adjacent inner edge of either of said rim sections.

2. A press wheel for planters and the like as defined in claim 1, further characterized by means for detachably securing the radially inner portions of said struts to the peripheral portion of said disk section.

References Cited in the file of this patent

UNITED STATES PATENTS

| | | |
|---|---|---|
| 422,931 | Galt et al. | Mar. 11, 1890 |
| 1,004,655 | Johnson | Oct. 3, 1911 |
| 2,601,464 | Tanke | June 24, 1952 |
| 2,604,836 | Berwick | July 29, 1952 |

FOREIGN PATENTS

| | | |
|---|---|---|
| 85,217 | Sweden | Nov. 7, 1935 |
| 597,153 | Great Britain | Jan. 20, 1948 |